United States Patent [19]

Davis

[11] Patent Number: 5,016,426

[45] Date of Patent: May 21, 1991

[54] BIASED CROSS SEAL FOR PACKAGING MACHINE

[75] Inventor: Steven D. Davis, Yuciapa, Calif.

[73] Assignee: W. A. Lane, Inc., San Bernardino, Calif.

[21] Appl. No.: 393,524

[22] Filed: Aug. 11, 1989

[51] Int. Cl.[5] .................. B65B 9/02; B65B 51/12; B30B 5/00
[52] U.S. Cl. ................................ 53/554; 53/373.7; 156/583.4
[58] Field of Search ............... 53/373, 479, 550, 551, 53/554, 552, 553; 156/583.1, 583.4, 583.8

[56] References Cited

U.S. PATENT DOCUMENTS

| | | | |
|---|---|---|---|
| 2,361,052 | 10/1944 | Patterson | 53/551 X |
| 2,624,992 | 1/1953 | Salfisberg | 53/551 |
| 2,655,979 | 10/1953 | Eaton | 53/373 |
| 2,764,862 | 10/1956 | Rado | 53/550 X |
| 3,287,199 | 11/1966 | Virta | 156/583.1 |
| 3,583,126 | 6/1971 | McCollough | 53/551 X |
| 3,779,838 | 12/1973 | Wech | 156/583.1 |
| 3,874,976 | 4/1975 | MacFarland | 156/583.1 X |
| 4,637,199 | 1/1987 | Steck et al. | 53/551 X |
| 4,862,672 | 9/1989 | Lane, Sr. | 53/282 |

FOREIGN PATENT DOCUMENTS 901758 7/1962 United Kingdom ............ 53/551

Primary Examiner—Robert L. Spruill
Assistant Examiner—Beth Bianca
Attorney, Agent, or Firm—Herb Boswell

[57] ABSTRACT

A biased seal for a form, fill and seal packaging machine includes an elongated seal bar which is attached to a support element via a plurality of connectors/retainers which are fixed to the seal bear, but movable with respect to the support element. A plurality of compression springs are positioned between the seal bar and the support element. The seal bar is movable on the connectors from a position wherein the seal bar is juxtapositioned against the sealing element and the compression springs are under compression and an extended position wherein the seal bar is displaced outward from the sealing elements by the bias in the compression springs. The support element is fixed to a slide assembly which is connected to an activator rod via an adjustment bracket. When used in combination with an opposing seal bar, the combination of the adjustable bracket assembly and the biased seal bar allows for variable amounts of pressure to be applied to films which are sealed together between the bias seal bar and the further seal bar.

9 Claims, 2 Drawing Sheets

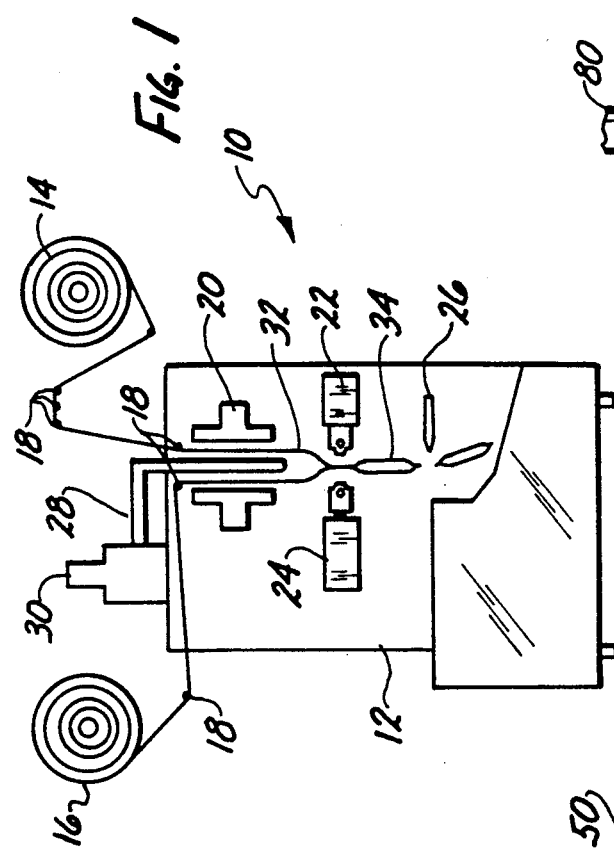
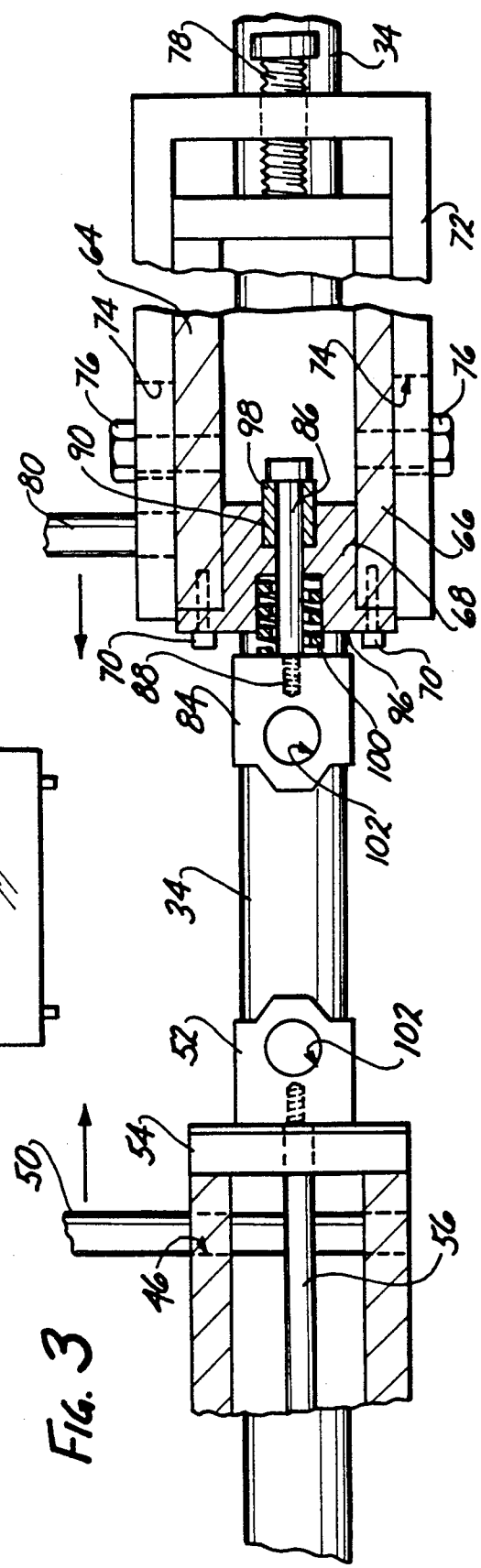
Fig. 1
Fig. 3

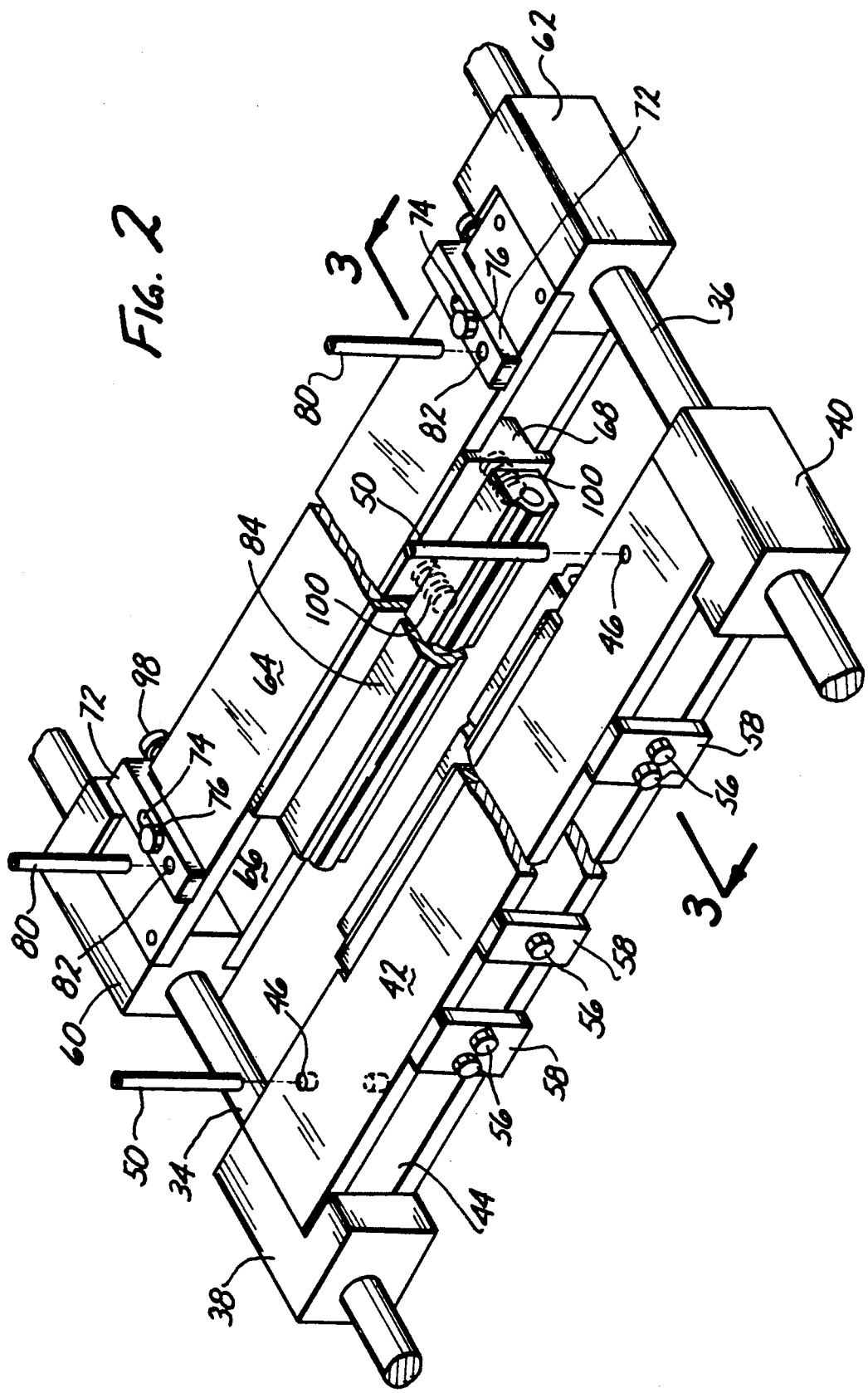

BIASED CROSS SEAL FOR PACKAGING MACHINE

BACKGROUND OF INVENTION

This invention is directed to a biased seal bar for a form, fill and seal packaging machine. A biasing means is positioned between a seal bar and a support element whereby the seal bar can move against the bias of the biasing elements during a sealing operation to insure absolute parallel mating of the seal bar with a further seal bar.

A variety of products are packaged in film pouches which are formed, filled and sealed on appropriate packaging machines. These machines utilize continuous rolls of film. A pouch is formed from the film, filled with product and then sealed in a continuous operation.

To form pouches on a form, fill and seal pouch packaging machine, side seams are formed between front and back films via side seals. A cross seal is then utilized to form the bottom seam. This three sided pouch is then filled with product and the machine is indexed. A further cross seal is now utilized to form the top seam on this filled pouch and concurrently the bottom seam on the next partly formed but still empty pouch. The machine is indexed and the cycle continued.

Both the side seams and the cross seams (herein after also referred to as side seals and cross seals) are formed by opposing front and back seal bars which come together to pressurize and heat seal front and back rolls of film together. The heat and pressure forms a seal between the films to create the various pouch seams.

A typical pouch packaging machine is capable of concurrently forming a linear array of side by side pouches across the width of the machine. The number of side by side pouches which are concurrently formed can vary from a single pouch when large pouches are being formed to 16 to 20 pouches when narrower pouches are being formed, as for instance, condiment pouches. Thus, on a machine utilizing 24 inch film, concurrently 16 side by side one and a half inch condiment pouches can be formed.

The front and back cross seal bars on such machines come together across the width of the films which are being sealed together. This forms a seam. It is important that the sealing faces of these cross seal bars be very parallel to one another. With parallel cross seal bars, the seal formed between the films on one side, as for instance the left side, is formed under the same pressure as the seal formed on the other side, the right side of the film.

Since seams are formed in the film utilizing both heat and pressure it is necessary to heat the seal bars, both the side seal bars and the cross seal bars. Heating these bars inevitably leads to expansion. A typical film being sealed may be film that is from 1.0 to 1.5 mils in thickness. It is not uncommon for a cross seal bar to expand at least 1.0 mils when heated. While expansion across the width of the bar should be constant, there can be minor expansion differences between one side of a seal bar and its opposite side.

Presently used form, fill and seal packaging machines rely only on a threaded adjustment for positioning of the seal bars with respect to one another. To get front and back seal bars in perfect parallel alignment can require considerable trial and error adjustment. Even then an exact even pressure may not be applied across the total width of the seal bar. This arises because of minor differences which were not discernible to the operator when the seal bar were adjusted or because of uneven heat expansion of the seal bars during production runs.

An improperly formed seal in a pouch can lead to rupture of the pouch. This renders such a pouch useless. This, of course, detracts from the economics of operation of the form, fill and seal packaging machine. It is thus evident to maximize production of a form, seal and fill packaging machine it is important that perfect seals be formed across the totality of the width of film during the production run of the machine.

BRIEF DESCRIPTION OF THE INVENTION

In view of the above it is a broad object of this invention to provide for a biased seal for a form, fill and seal packaging machine. Such a biased seal is self adjusting with respect to the pressure applied to the seal across the width of the seal.

This and other objects as will be evident form the remainder of this specification are achieved in a bias seal for a form, fill and seal packaging machine which includes an elongated seal bar which is supported on the machine on a support means. A connecting means is utilized to movably attach the seal bar to the support means. A biasing means is utilized for biasing the seal bar from a position wherein the seal bar is juxtapositional with the support means towards a distal position wherein the seal bar is spaced from the support means.

In an illustrative embodiment of the invention the connector means comprises a plurality of connectors arranged in a linear array across the elongated dimension (the width) of the seal bar and the biasing means comprises a plurality of biasing springs also arranged in a linear array between the seal bar and the support means.

The objects of the invention can be further achieved in a biased seal for a form, fill and seal pouch packaging machine which includes an elongated seal bar which is connected via a plurality of connecting means to a reciprocating means. The reciprocating means reciprocally moves on the packaging machine on a guide means. A biasing means is included for biasing the seal bar from a position wherein the seal bar is juxtapositional with the reciprocating means to a position wherein it is distal from the reciprocating means.

The guide means can include left and right guide rods and the reciprocating means can include a slide assembly operatively mounted on these guide rods to reciprocally slide on them. The reciprocating means can further include an activator means for sliding the slide assembly on the guide rods. An adjustment means is utilized for positioning the slide assembly with respect to the activator means. The adjustment means can include at least one bracket, a variable positioning means and a locking means. The variable positioning means is utilized for positioning the bracket with respect to the slide assembly in a continuum of positions and the locking means is utilized to fix the bracket to the slide assembly in one of those continuum of positions.

BRIEF DESCRIPTION OF THE DRAWINGS

This invention will be better understood when taken in conjunction with the drawings wherein:

FIG. 1 is a side elevational view of a typical form, fill and seal pouch packaging machine;

FIG. 2 is an isometric view of a biased seal of the invention as well as a standard seal which is utilized in conjunction with the bias seal to form a seal between packaging films; and FIG. 3 is a side elevational view about the line 3—3 of FIG. 2.

This invention utilizes certain principles and/or concepts as are set forth in the claims appended hereto. Those skilled in the packaging arts will realize that these principles and/or concepts are capable of being utilized in a variety of embodiments which may differ from the embodiment utilized for illustrative purposes herein. For this reason this invention is not to be construed as being limited solely to the illustrative embodiment, but should only be construed in view of the claims appended here to.

DETAILED DESCRIPTION OF THE INVENTION

FIG. 1 illustrates the basic components of a form, fill and seal pouch packaging machine. The form, fill and seal pouch packaging machine 10 illustrated in the figure includes a housing 12. Supported on the housing 12 are a front roll of film 14 and a rear roll of film 16. The film is fed across feed rollers collectively identified by the numeral 18 to a position in between front and back side seals collectively identified by the numeral 20. Positioned below and downstream of the side seals 20 are front cross seal 22 and rear cross seal 24. Positioned below and downstream of the cross seals 22 and 24 is a cut off knife 26.

A feed tube 28 leads from a product reservoir 30 to a position between the films. The end of the feed tube 28 is suspended within a partially formed pouch generally identified by the numeral 32.

Side seams are formed by the side seals 20 in the descending film from rolls 14 and 16. The machine is then indexed moving the film having the side seams therein from the side seal station to the cross seal station. A cross seal (a seam) is now formed by the front and back cross seals 22 and 24. Product can then be added to the partially formed pouch 32 via the feed tube 28 feeding from the reservoir 30.

Once the partially formed pouch 32 is filled with product on the next index of the machine the partially formed pouch 32 descends below the cross seals 22 and 24. Upon the next activation of the cross seals 22 and 24 a cross seam is formed to seal the pouch 32. The pouch 32 is then severed by the cut off knife 26 from the descending stream of pouches being formed on the machine 10.

This invention utilizes a spring loaded seal as the front seal as, for instance, front seal 22 of the machine of FIG. 1. It is utilized in conjunction with a standard rear seal bar. The spring loaded front seal bar of the invention and the standard rear seal bar come together to compress and heat film positioned between them to form an appropriate cross seal or seam in that film. The spring loaded or biased seal bar of the invention utilized for the front seal automatically compensates for any mis-alignment between the front and rear seal bars such that a consistent seal is formed across the width of the films being sealed together.

In reference now to FIGS. 2 and 3, left and right guide rods 34 and 36 respectively, are appropriately mounted on a form, fill and seal pouch packaging machine, as for instance, the machine 10 of FIG. 1. Slide blocks 38 and 40 are connected together via upper and lower strong back members 42 and 44.

Openings 46 and 48 are sized to receive actuator bars collectively identified by the numeral 50. The actuator bars 50 are moved reciprocally back and forth along the axis of the guide rods 34 and 36 by standard mechanisms as, for instance, hydraulic cylinders typically found on form, fill and seal pouch packaging machines. This slides the assembly composed of the members 42 and 44 and the slide boxes 38 and 40 along the guide rods 34 and 36.

A rear seal bar 52 is held against a front positioning plate 54 via a plurality of bolts collectively identified by the numeral 56 which pass through rear positioning plates collectively identified by the numeral 58. The bolts 56 pass through openings formed in the front positioning plate 54 and thread into the back of rear seal bar 52 to attach the same to the strong backs 42 and 44. This assembly is as is standard in typical form, fill and seal pouch packaging machines.

Front slide blocks 60 and 62 are also positioned on the guide rods 34 and 36 for reciprocal movement. Upper and lower strong back members 64 and 66 extend between and connect to the guide blocks 60 and 62.

A support element 68 which is tee ("T") shaped in cross section as is evident from FIG. 3 is appropriately fixed via bolts collectively identified by the numeral 70 to the strong back members 64 and 66.

"U" shaped brackets collectively identified by the numeral 72 (only the top arm of which can be seen in the FIG. 2) extend across the top of the upper strong back member 64 down along the back edges of the strong back member 64 and then along the bottom of the strong back member 66. The brackets 72 contain slots collectively identified by the numeral 74.

Locking bolts collectively identified by the numeral 76 are utilized to fix the brackets 72 to the strong back members 64 and 66. An adjustment bolt 78 threads through the back of the bracket 72 and abuts against the edge of the strong back 64 for adjusting the position of the bracket 72 with respect to the strong backs 64 and 66. Once the brackets 72 are correctly positioned they are locked to the strong backs 64 and 66 via the locking bolts 76.

Actuator rods collectively identified by the numeral 80 fit into openings 82 in the brackets 72 for transferring reciprocal movement via the brackets 72 to the strong backs 64 and 66 and slide members 60 and 62 attached thereto. This serves to reciprocally move the assembly composed of the strong backs 64, 66, slide members 60 and 62 and brackets 72 in a reciprocal manner on the guide rods 34 and 36.

Taken together the totality of the elements 60, 62, 64, 66, 72 and 68 can be considered as a support or reciprocating means. Taken together the members 60, 62, 64 and 66 can be considered as a slide assembly and the brackets 72 and their component parts including the locking bolts 7 and the adjusting bolts 78 as an adjustment means. The actuator rods 80 can be considered as an activator means and the guide rods 34 and 36 can be considered as a guide means. The bolts 78 can be considered as adjustment means and the bolts 76 as a locking means.

A seal bar 84 attaches via a plurality of identical connecting rods 86 (only one of which is seen in side view in FIG. 3) to the tee shaped support element 68. The connecting rods are arrayed in a linear sequence along the length of the seal bar 84.

The connecting rods 86 are threaded at one end 88. The end 88 is threaded into appropriate openings formed in the seal bar 84. Bushings 90 (only one of which is seen in FIG. 3) fit into appropriate bores formed in the back surface 92 of the support element 68. A plurality of cavities 94 (only one of which can be seen in FIG. 3) are formed in front surface 96 of the support element 68. A bore extends through the bushings 90 and the support element 68 into the cavities 94. The connecting rods 86 pass through this bore and are retained therein by head 98 formed on the opposite end of the connecting rods 86 from their threaded end 88. By virtue of the head 98, the connecting rods 86 are not only connectors but also serve as retaining means for maintaining the seal bar 84 connected to the support element 68.

Around each of the connecting rods 86 and recessed within the cavities 94 are compression springs 100 (only one of which can be seen in FIG. 3 and two of which are illustrated in FIG. 2). The connecting rods 86 axially pass through the center of the compression springs 100 as is evident from FIG. 3.

The seal bar 84 is slidably connected (and retained) to the support element 68 via the connecting rods 86. It however, is biased away from the front surface 96 of the element 68 by the compression springs 100 If suitable pressure on the seal bar 84 was applied from the left to right as viewed in FIG. 3, the compression springs 100 could be totally compressed into the cavities 94 allowing the back side of the seal bar 84 to abut against and be juxtapositional against the front face 96 of the support element 68.

When the actuator rods 50 and 80 are brought together during operation of a form, fill and seal packaging machine utilizing the invention, this brings the seal bars 52 and 54 toward one another. After initial contact of the seal bars 52 and 84 together any mis-alignment of these seal bars along their elongated length is compensated for by the bias in the compression springs 100. Thus, even and consistent pressure is applied between the seal bars 52 and 54 along the totality of their lengths.

The brackets 72 are utilized to adjust the seal bars 52 and 84 such that they are in an approximate parallel relationship with one another. As opposed to prior art form, fill and seal packaging machines which utilize two seal bars equivalent to those of seal bar 52, use of the bias seal bar 84 of the invention automatically compensates for any minor mis-adjustment of alignment of the seal bars 52 and 84 with respect to one another.

Each of the seal bars 52 and 84 include a heater cavity, collectively identified by the numeral 102. An appropriate electrical resistance heating element (not shown or identified) is located in the cavities 102 to heat the seal bars 52 and 84 to a working temperature for the heat/pressure seal of films together. Any uneven thermal expansion of the bars 52 and 54 is also automatically compensated for by the compression springs 100 when the seal bars 52 and 54 are brought together during a sealing operation.

The stroke of the seal bar 84 is normally adjusted via the brackets 72 to be less than that which would totally compress the seal bar 84 against the face 96. This is utilized in conjunction with selecting the compression stiffness of the compression springs 100 such that they are sufficiently stiff to resist full compression into the cavities 94 but yielding enough to allow for any variability in the alignment of the seal bar 52 with that of the bar 84 to be taken up by compression of the springs 100.

I claim:

1. A biased seal for a form, fill and seal packaging machine comprising:

an elongated seal bar;

a support element for movably supporting said seal bar, said support element including a face, said seal bar located in association with said face to move from a position wherein said seal bar is juxtapositional with and contacts said face to a distal position wherein said seal bar is spaced away from said face;

said support element including a surface located on said support element opposite said face;

a plurality of connectors located in a linear array between said seal bar and said support element with each of said connectors fixedly connected to said seal bar and movably connected to said support element for movably attaching said seal bar to said support element;

a plurality of biasing springs located in a linear array between said seal bar and said support element for biasing said seal bar from said position wherein said seal bar is juxtapositional with said support element towards said distal position wherein said seal bar is spaced from said support element;

the number of said compression springs equal to the number of said connectors with each individual respective connector being associated with an individual respective compression spring and including the compression spring being located around the connector;

said face including a plurality of cavities equal in number to the number of said springs, said cavities located in a linear array along said face and opening towards said seal bar, each of said cavities further including a bore extending from said cavity to said surface;

each respective biasing spring located in a respective one of said cavities with the respective connector associated with the respective spring slidably located in the respective bore extending from the respective cavity;

each of said biasing springs extendible from its respective cavity in an unbiased condition and retractable into its respective cavity in a biased condition, said cavities being sized with respect to said biasing springs such that each of said springs is completely retractable into its respective cavity when said seal bar contacts said face; and each of said connectors having a retaining head and a shank, said shanks sized to fit into and slide in said bores, said retaining heads sized larger than said bores and positioned proximal to said surface with said shanks extending from said retaining heads, through said bores, out of said cavities and connecting to said seal bar.

2. A biased seal of claim 1 further including:

left and right guide rods;

a slide assembly operatively mounted on said left and right guide rods to reciprocally slide on said guide rods, said support element fixedly connected to said slide assembly;

activator means for sliding said slide assembly on said guide rods; and adjustment means for variably positioning said slide assembly with respect to said activator means, said adjustment means operatively interspaced between said slide assembly and said activator means whereby motion is transferred from said activator means to said slide assembly through said adjustment means.

3. A biased seal of claim 2 wherein:

said adjustment means includes at least one bracket, said bracket having a coupling means for connecting to said activator means;

said adjustment means further includes a variable positioning means for positioning said bracket with respect to said slide assembly in a continuum of positions; and said adjustment means further includes a locking means for fixedly positioning said bracket to said slide assembly in one of said continuum of positions.

4. In combination with a form, fill and seal packaging machine of the type having a housing with left and right cross seals guide rods fixedly mounted on said housing, an improvement comprising:

an elongated seal bar;

a slide assembly operatively mounted on said left and right guide rods to reciprocally slide on said guide rods;

activator means for sliding said slide assembly on said guide rods;

adjustment means for variably positioning said slide assembly with respect to said activator means axially in a direction parallel with the axes of said guide rods;

said adjustment means operatively interspaced between said slide assembly and said activator means whereby motion is transferred from said activator means to said slide assembly through said adjustment means;

a plurality of connecting means for movably attaching said seal bar to said slide assembly; and biasing means for biasing said seal bar from a position wherein said seal bar is juxtapositional with said slide assembly towards a distal position wherein said seal bar is spaced from said slide assembly.

5. A biased seal for a form, fill and seal packaging machine comprising:

an elongated seal bar;

left and right guide rods;

a slide assembly operatively mounted on said left and right guide rods to reciprocally slide on said guide rods;

activator means for sliding said slide assembly on said guide rods;

adjustment means for variably positioning said slide assembly with respect to said activator means;

said adjustment means operatively interspaced between said slide assembly and said activator means whereby motion is transferred from said activator means to said slide assembly through said adjustment means;

said adjustment means including at least one bracket, said bracket having a coupling means for connecting to said activator means;

said adjustment means further including a variable positioning means for positioning said bracket with respect to said slide assembly axially in a direction parallel to the axes of said guide rods in a continuum of positions arrayed along said direction parallel to said axes of said guide rods;

said adjustment means further including a locking means for fixedly positioning said bracket to said slide assembly in one of said continuum of positions;

a plurality of connecting means for movably attaching said seal bar to said slide assembly; and biasing means for biasing said seal bar from a position wherein said seal bar is proximal to said slide assembly towards a position wherein said seal bar is spaced distal from said slide assembly.

6. A biased seal of claim 5 including:

a support element, said support element tee shaped in cross section, said support element fixedly attached to said slide assembly;

said connecting means having a plurality of connectors located in a linear array, said connectors fixedly connected to said seal bar and movably attaching to said support element; and said biasing means having a plurality of biasing springs located in a linear array in operative association between said seal bar and said support element.

7. A biased seal of claim 5 wherein:

said slide assembly is an elongated assembly having ends, said slide assembly operatively mounted to said left guide rod about one of its ends and operatively mounted to said right guide rod about the other of its ends; and said bracket positioned with respect to said slide assembly so as to be positioned between said ends of the slide assembly displaced inwardly from both of said slide rods.

8. A biased seal of claim 5 wherein:

said slide assembly is an elongated assembly having ends;

said slide assembly including an opening located adjacent each of its ends;

said slide assembly mounted to said guide rods by locating said left guide rod in the opening on one of the ends of said slide assembly and locating said right guide rod in the opening in the other of the ends of said slide assembly.

9. A biased seal of claim 8 wherein:

said bracket is positioned with respect to said slide assembly so as to be positioned between said ends of the slide assembly displaced inwardly from both of said slide rods.

* * * * *